United States Patent
Bou (10) Patent No.: US 6,417,865 B1
(45) Date of Patent: Jul. 9, 2002

(54) AFFINITIVE PLACEMENT BY PROXIMITY IN A COMPUTER-IMPLEMENTED GRAPHICS SYSTEM

(75) Inventor: Robert E. Bou, Austin, TX (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/265,021

(22) Filed: Mar. 9, 1999

(51) Int. Cl.$^7$ ................................. G09G 5/00
(52) U.S. Cl. .................. 345/619; 345/648; 345/473
(58) Field of Search ................ 345/651, 652, 345/677, 678, 619, 676, 672, 650, 648, 649, 663, 473

(56) References Cited

U.S. PATENT DOCUMENTS

| | | |
|---|---|---|
| 4,951,231 A | 8/1990 | Dickinson et al. |
| 5,101,436 A | 3/1992 | DeAguiar et al. |
| 5,123,087 A | 6/1992 | Newell et al. |
| 5,133,052 A | 7/1992 | Bier et al. |
| 5,237,647 A | 8/1993 | Roberts et al. |
| 5,325,475 A | 6/1994 | Poggio et al. |
| 5,371,845 A | 12/1994 | Newell et al. |
| 5,396,590 A | 3/1995 | Kreegar |
| 5,490,241 A | 2/1996 | Mallgren et al. |
| 5,513,303 A | 4/1996 | Robertson et al. |
| 5,513,309 A | 4/1996 | Meier et al. |
| 5,572,639 A | 11/1996 | Gantt |
| 5,627,949 A | 5/1997 | Letcher, Jr. |
| 5,633,955 A | 5/1997 | Bozinovic et al. |
| 5,704,028 A | 12/1997 | Schanel et al. |
| 5,712,965 A | 1/1998 | Fujita et al. |
| 5,734,805 A | 3/1998 | Isensee et al. |
| 5,734,806 A | 3/1998 | Narayanaswami |
| 5,734,807 A | 3/1998 | Sumi |
| 5,784,068 A | 7/1998 | Brown |
| 5,793,377 A | 8/1998 | Moore |
| 5,815,415 A | 9/1998 | Bentley et al. |
| 6,232,983 B1 * | 5/2001 | Felser et al. ............... 345/433 |

OTHER PUBLICATIONS

Townsend et al., Microsoft Office 6 in 1, 1994, Que Corporation, p. 713.

* cited by examiner

*Primary Examiner*—Mark Zimmerman
*Assistant Examiner*—Enrique L. Santiago
(74) *Attorney, Agent, or Firm*—Gates & Cooper LLP (57) ABSTRACT

A computer-implemented graphics program provides affinitive placement of objects by proximity, wherein two or more objects are automatically placed in a drawing relative to one another using similarly-situated and previously-placed objects as examples for the suggested placement of the objects.

45 Claims, 8 Drawing Sheets

AFFINITIVE PLACEMENT BY PROXIMITY IN A COMPUTER-IMPLEMENTED GRAPHICS SYSTEM

CROSS-REFERENCE TO RELATED APPLICATIONS

This application is related to the following co-pending and commonly-assigned patent applications, all of which applications are incorporated by reference herein:

Application Ser. No. 08/774,241, filed on Nov. 5, 1996, by Brian D. Gantt, entitled "METHOD AND SYSTEM FOR INTERACTIVELY DETERMINING AND DISPLAYING GEOMETRIC RELATIONSHIPS BETWEEN THREE DIMENSIONAL OBJECTS BASED ON PREDETERMINED GEOMETRIC CONSTRAINTS AND POSITION OF AN INPUT DEVICE", now U.S. Pat. No. 6,016,147, issued on Jan. 18, 2000.

Application Ser. No. 09/088,116, filed Jun. 1, 1998, by Lawrence D. Felser et al., entitled "POSITIONING AND ALIGNMENT AIDS FOR SHAPE OBJECTS HAVING AUTHORABLE BEHAVIORS AND APPEARANCES," now U.S. Pat. No. 6,232,983, issued on May 15, 2001; and Application Ser. No. 09/256,896, filed on Feb. 24, 1999, by Alexander Thoemmes et al., entitled "ACQUIRING AND UNACQUIRING ALIGNMENT AND EXTENSION POINTS."

BACKGROUND OF THE INVENTION

1. Field of the Invention

The present invention relates generally to computer-implemented graphics systems, and in particular, to a method, apparatus, and article of manufacture for providing affinitive placement by proximity in a computer-implemented graphics system.

2. Description of the Related Art

Computer-implemented graphics systems have been widely used by designers, illustrators, drafters, and engineers for a number of years. Most such graphics systems use a graphical user interface (GUI) to display graphical images, such as 2D or 3D models, schematic diagrams, photorealistic images, etc.

Some graphics programs provide templates and component palettes that help users create documents, images, graphical presentations, etc. However, these templates and palettes provide only limited assistance in the placement and connection of objects in the document. Typically, if a user wants to connect objects together in the document, the user must drag the objects onto the working document displayed on the monitor, and subsequently use mouse-accessed, toolbar-accessed, or menu-accessed functions to move the object, place the object, rotate or orient the object, size the object, etc., in order to create a finished document.

This multiple step approach of dragging the object onto the displayed document and then modifying the object's placement, orientation, etc., to create a drawing is inefficient and time consuming. Further, the process is not easily learned by a user, and prevents many users from using the graphic system to its fullest extent.

Consequently, there is a need in the art for improved techniques for placing objects in documents using a graphics system. Specifically, there is a need in the art for improved techniques for placing objects in documents that eliminates the need for accessing mouse, toolbar, or menu functions and duplicates the placement of other similarly-situated objects.

SUMMARY OF THE INVENTION

To address the requirements described above, the present invention discloses a method, apparatus, and article of manufacture for affinitive placement of objects by proximity, wherein two or more objects are automatically placed in a drawing relative to one another using similarly-situated and previously-placed objects as examples for the suggested placement of the objects.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The preferred embodiment of the present invention describes a computer-implemented graphics program that provides affinitive placement of objects by proximity, wherein two or more objects are automatically placed in the drawing relative to one another using similarly-situated and previously-placed objects as examples for the suggested placement of the objects.

Hardware Environment

Figure 1:
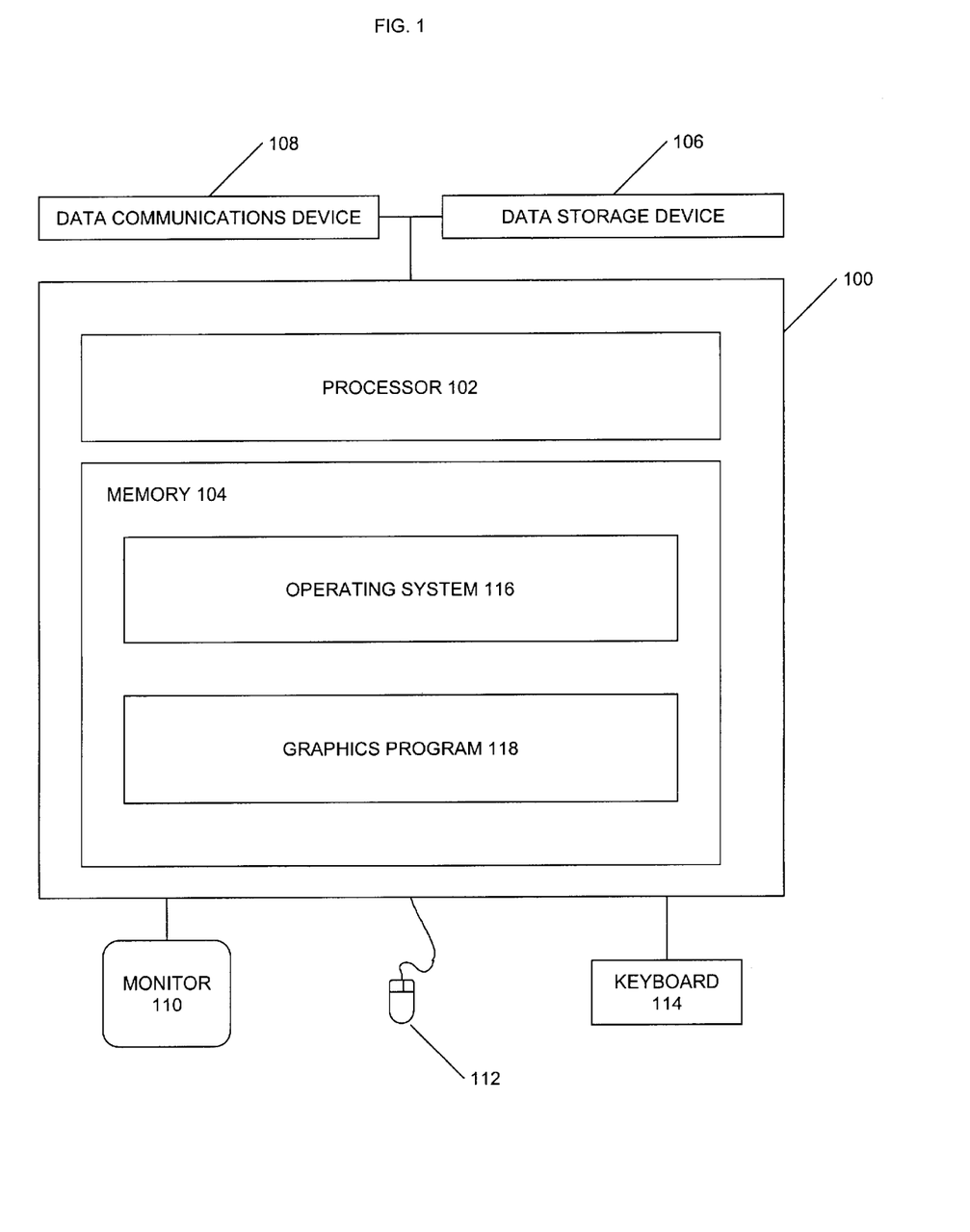
FIG. 1 is an exemplary hardware environment used to implement the preferred embodiment of the invention.

FIG. 1 is an exemplary hardware environment used to implement the preferred embodiment of the invention. The preferred embodiment of the present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the personal computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 usually operates under the control of an operating system 116. The preferred embodiment of the present invention is implemented by computer-implemented graphics program 118 that operates under the control of the operating system 116. In the preferred embodiment, the graphics program 118 comprises the AUTOCAD® program sold by Autodesk, Inc., the assignee of the present invention.

However, it should be understood that, in the alternative, the present invention may also apply to other computer programs or to specific utilities or functions performed by the computer 100 or within the operating system 116 itself. In general, the functions performed in the present invention, whether implemented as part of an operating system 116 or a specific computer program 118, will be referred to herein as "computer programs".

Generally, the operating system 116 and graphics program 118 comprise logic and/or data embodied in or readable from a device, media, or carrier, e.g., one or more fixed and/or removable data storage devices 106 connected directly or indirectly to the computer 100, one or more remote devices coupled to the computer 100 via the data communications devices 108, etc.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Computer-Implemented Graphics Program

Figure 2:
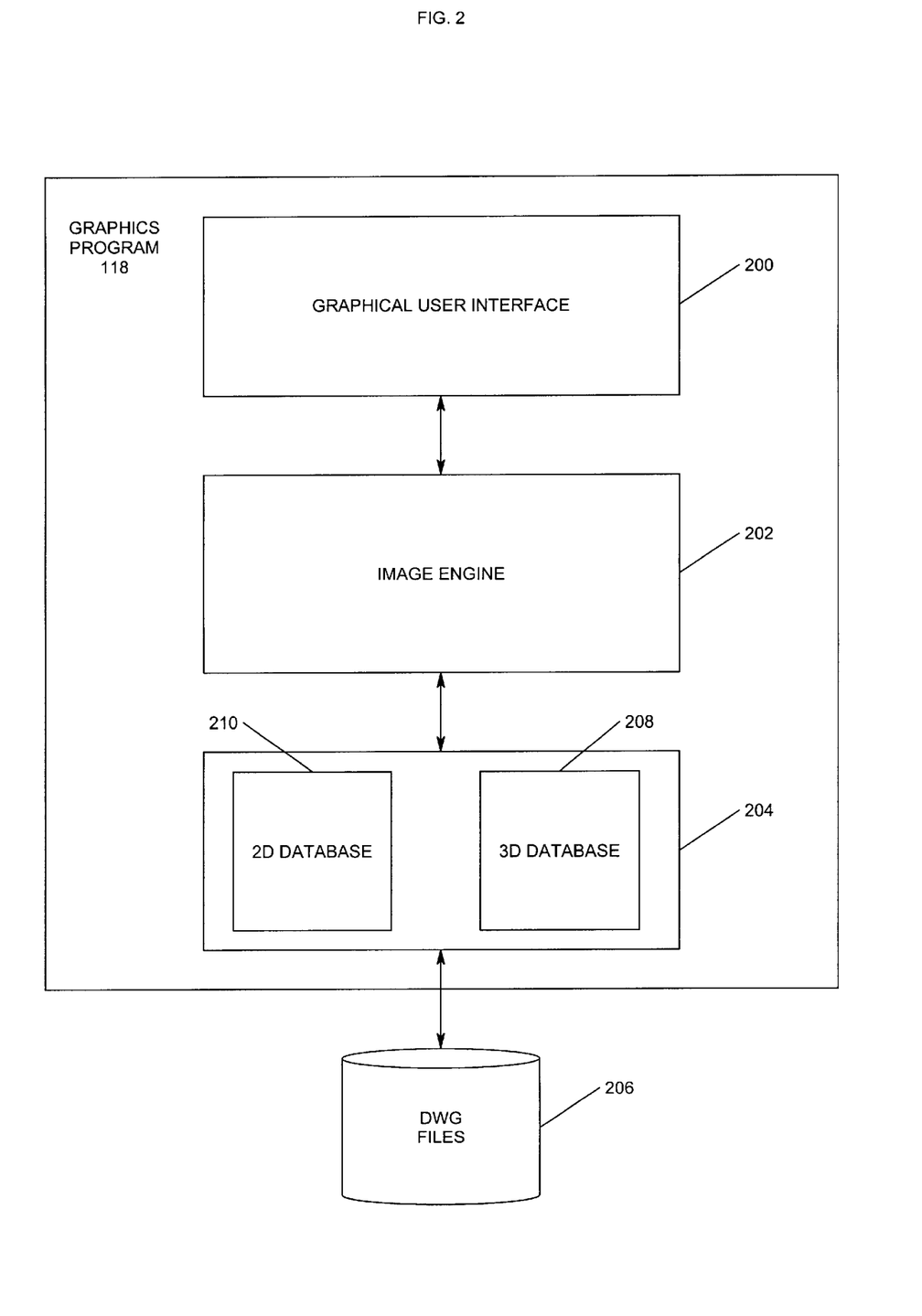
FIG. 2 is a block diagram that illustrates the components of the computer-implemented graphics program according to the preferred embodiment of the present invention.

FIG. 2 is a block diagram that illustrates the components of the graphics program 118 according to the preferred embodiment of the present invention. There are three main components to the graphics program 118, including: a Graphical User Interface (GUI) 200, an Image Engine (IME) 202, and a database (DB) 204 for storing objects in Drawing (DWG) files 206.

The Graphical User Interface 200 displays information to the user and provides the functionality for the user's interaction with the graphics program 118.

The Image Engine 202 processes the DWG files 206 and delivers the resulting graphics to the monitor 110 for display. In the preferred embodiment, the Image Engine 202 provides a complete application programming interface (API) that allows other computer programs to interface to the graphics program 118 as needed.

The Database 204 is comprised of two separate types of databases: (1) a 3D database 208 known as the "world space" that stores 3D information; and (2) one or more 2D databases 210 known as the "virtual spaces" or "view ports" that stores 2D information.

Object List

Figure 3:
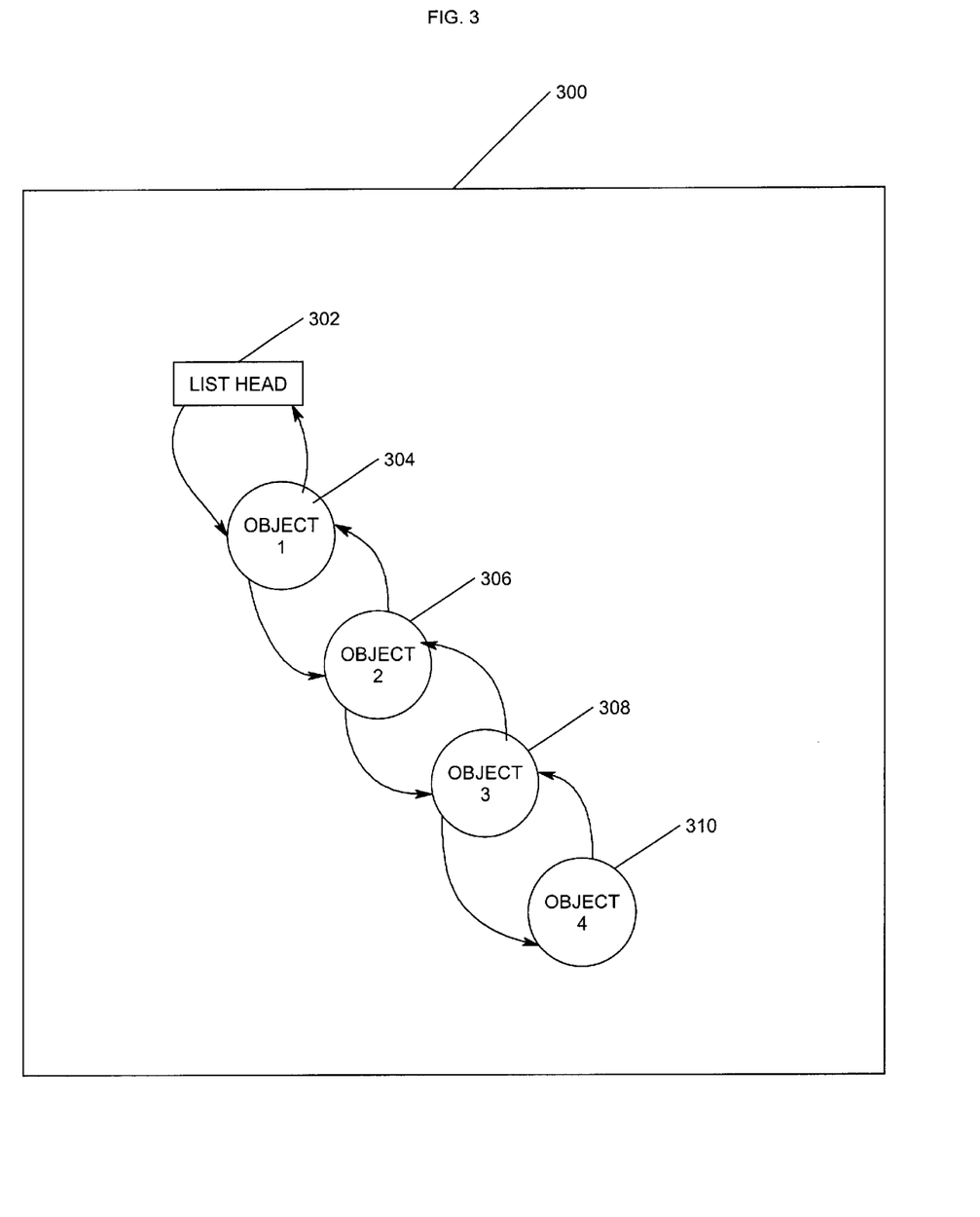
FIG. 3 is a block diagram that illustrates the structure of an object list maintained by each of the three-dimensional database of the computer-implemented graphics program according to the preferred embodiment of the present invention.

FIG. 3 is a block diagram that illustrates the structure of an object list 300 maintained by the 3D databases 208 according to the preferred embodiment of the present invention. The object list 300 is usually comprised of a doubly linked list having a list head 302 and one or more list objects 304, 306, 308, and 310, although other structures may be used as well.

Affinitive Placement by Proximity

The graphics program 118 includes a number of different functions for assisting the user in the placement of objects in a document. In the preferred embodiment, these functions may involve the use of a rectangular or polar placement grids, user guides, geometric extensions, etc. In addition, the graphics program 118 may include objects that automatically orient themselves and/or cling relative to other objects displayed in the document.

The preferred embodiment of the present invention extends such functionality to include an independent mode of interaction that is appropriate for more complex drawings, such as drawings that include sub-assemblies, e.g., windows within walls, holes within plates, etc. The graphics program 118 of the preferred embodiment uses a function known as "suggest from example" to assist in the placement of objects in the document.

Whenever an object is "active" for placement or movement, the graphics program 118 examines the object and its proximate or "affinity" objects. The graphics program 118 then examines the database 204 for other similar objects attached to the same affinity object or to similar affinity objects that are either proximate to the active object, visible from the active object, or have previously been nominated by the user for use as an example. Note that this examination of the database 204 is not limited to exact similarities between objects, but may include objects that are only somewhat similar.

Once the similar objects and their affinity objects are found, the (graphical and nongraphical) attributes and characteristics of these similar objects and their affinity objects may be inherited as defaults for the active object relative and its affinity object, and the relationships between the similar objects and their affinity objects may provide examples for suggested placements of the active object relative to its affinity object. In addition, if more than one example relationship is found, then the example relationships may be ranked according to their similarity to the active object and its affinity object, and presented to the user according to such a ranking. Moreover, the graphics program 118 may visually indicate the suggested placement of the active object to the affinity object and/or may visually indicated which example relationships were used to determine the suggested placement.

By suggesting a particular placement of the active object relative to its affinity object using previously used relationships as examples, the graphics program 118 drastically reduces the time required to construct a drawing comprised of a number of similar objects combined in a similar manner. In the same manner, the graphics program 118 learns the preferred combination of objects during construction of the drawing, thereby eliminating the costs of predefining any logical or physical relationships among objects.

Operation of the Graphics Program

Figure 4A:
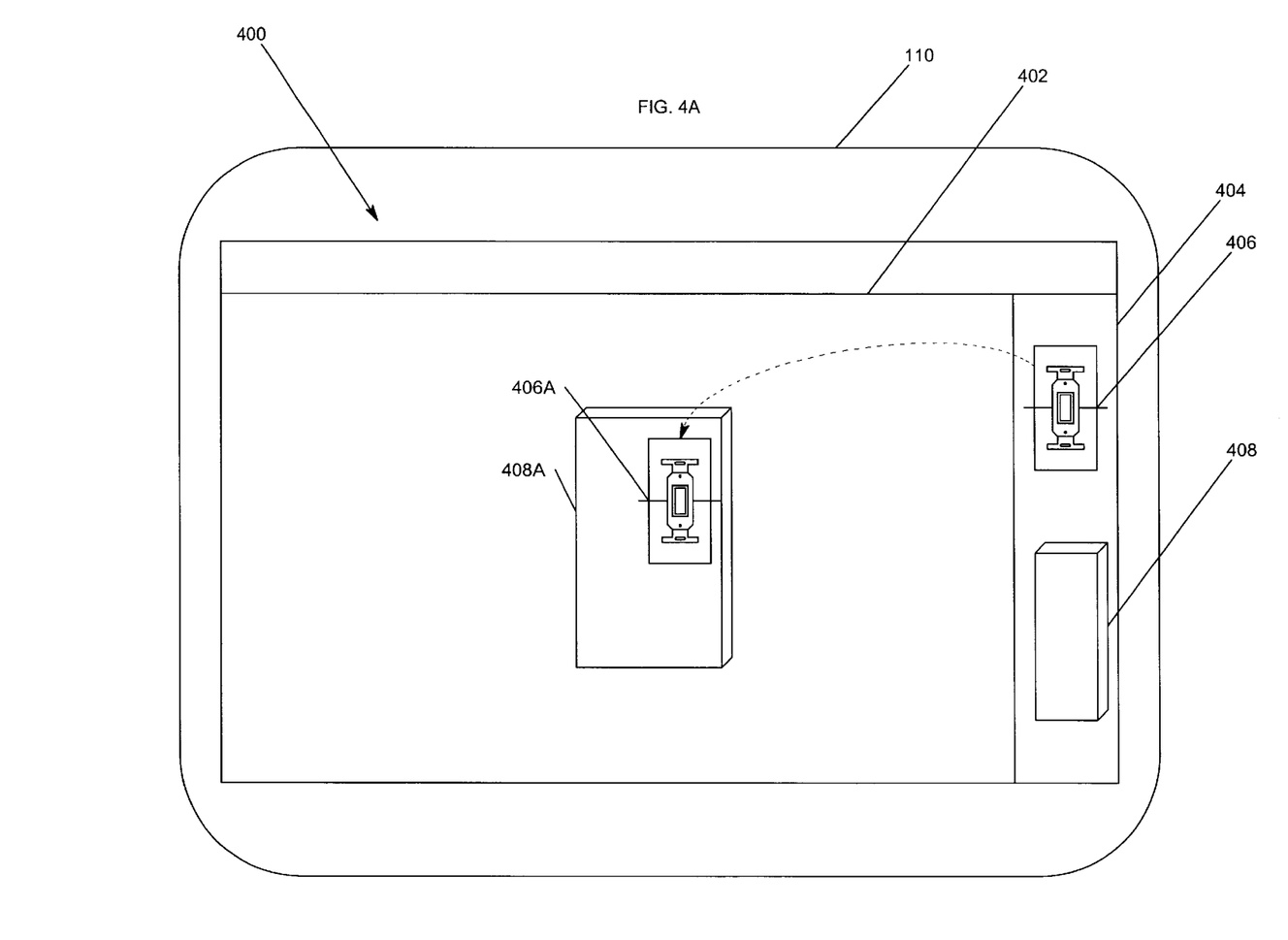
FIGS. 4A, 4B, and 4C are block diagrams that illustrate a viewport displayed on a monitor by the computer-implemented graphics program according to the preferred embodiment of the present invention.
Figure 4B:
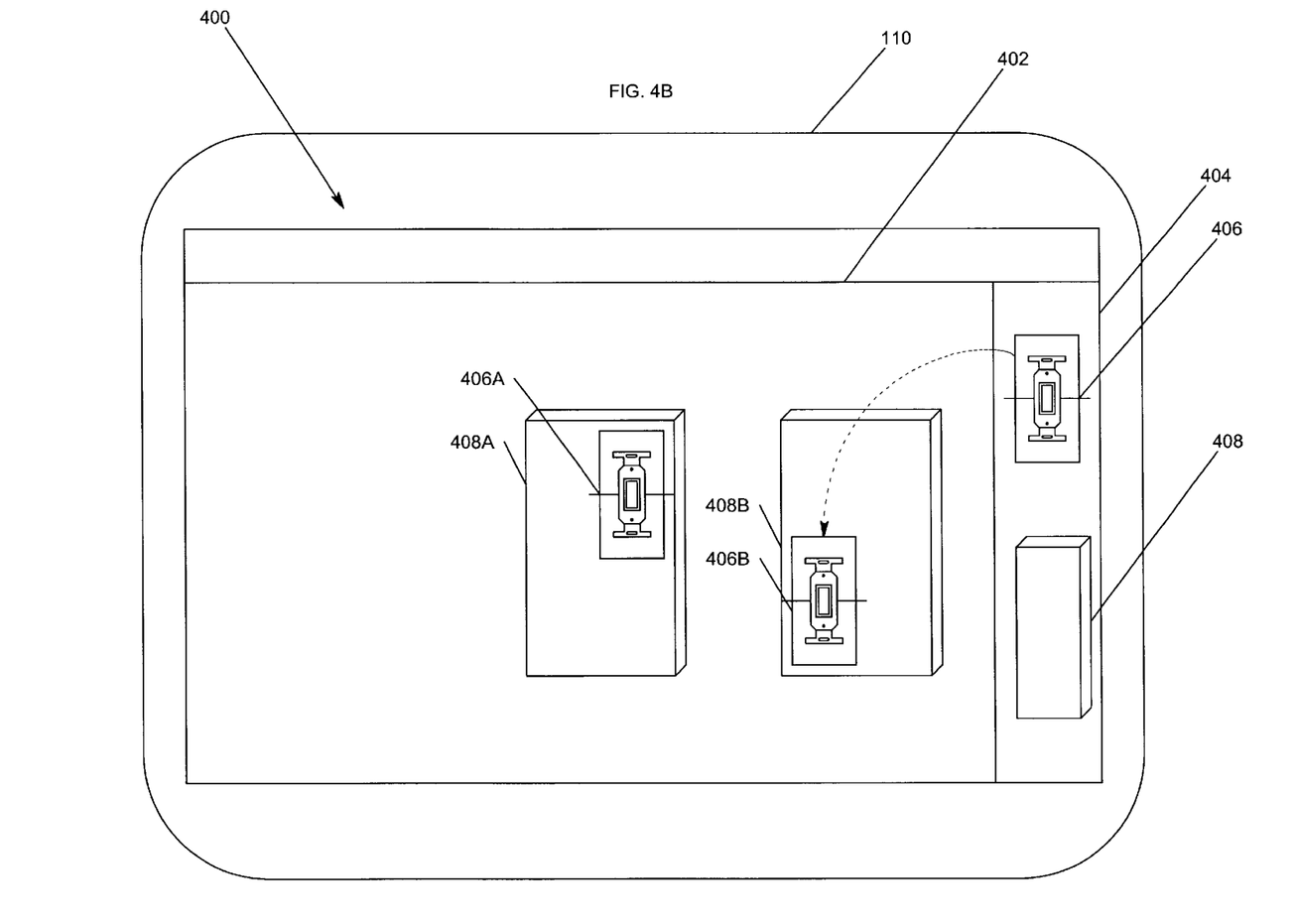
Figure 4C:
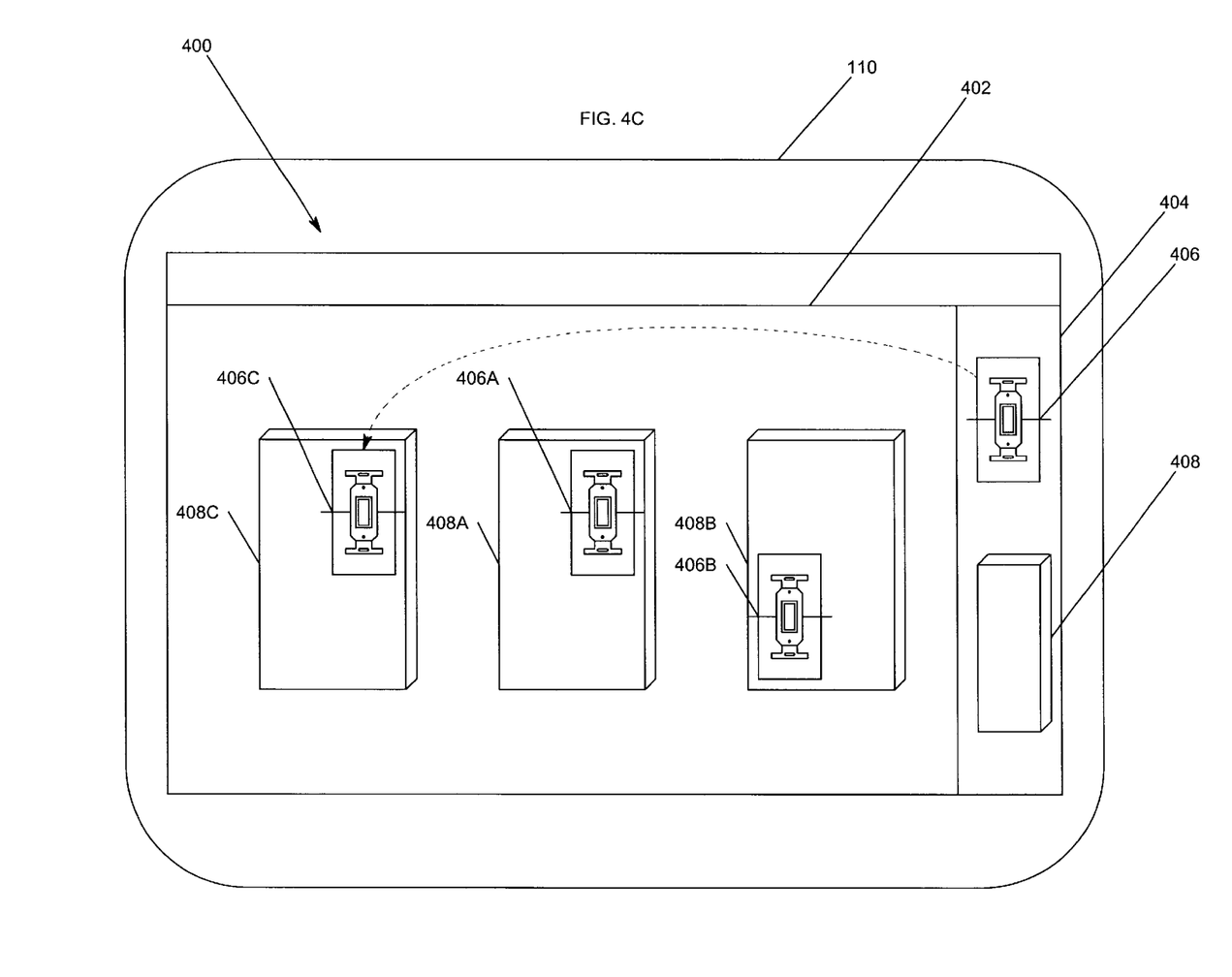

FIGS. 4A, 4B, and 4C are "snapshots" that illustrate a viewport 400 displayed on a monitor 110 by the graphics program 118 according to the preferred embodiment of the present invention. This viewport 400 may include one or more visual representations of one or more objects from the associated 3D database 208. These snapshots illustrate an exemplary sequence of events involving affinitive placement of objects according to the preferred embodiment of the present invention.

As shown in FIG. 4A, the viewport 400 displays a main window 402 and an object library window 404. Two objects 406 and 408 are illustrated in the object library window 404, including a light switch object 406 and a wall object 408, although other objects could be displayed and used as well. To create a document, the user drags one or more of the objects 406 and/or 408 from the object library window 404 to the main window 402, and drops the object(s) 406 and/or 408 onto a given spot within the working area of the main window 402. This process is repeated for the various objects as desired.

Specifically, in the example of FIG. 4A, a first wall object 408A is dragged from the object library window 404 and dropped onto the working area of the main window 402. Thereafter, a first light switch object 406A is dragged from the object library window 404 and dropped onto the first wall object 408 at a specific position, placement, or location with a specific orientation, etc., as indicated by the dotted line. This information is stored as attributes within either or both of the first light switch object 406A and the first wall object 408A.

In the example of FIG. 4B, a second wall object 408B is dragged from the object library window 404 and dropped onto the working area of the main window 402. Thereafter, a second light switch object 406B is dragged from the object library window 404 and dropped onto the second wall object 408B at a specific position, placement, or location with a specific orientation, etc., as indicated by dotted line. In this example, the attributes describing the relationship between the first light switch object 406A and the first wall object 408A are not used to define the relationship between the second light switch object 406B and the second wall object 408B; instead, the second light switch object 406B and the second wall object 408B are manually located.

In the example of FIG. 4C, a third wall object 408C is dragged from the object library window 404 and dropped onto the working area of the main window 402. Thereafter, a third light switch object 406C is dragged from the object library window 404 and dropped onto the third wall object 408C at a specific position, placement, or location with a specific orientation, etc., as indicated by dotted line. In this example, the attributes describing the relationship between the first light switch object 406A and the first wall object 408A are used to define the relationship between the third light switch object 406C and the third wall object 408C.

For example, if the first light switch object 406A is placed at a specific location, position, orientation, etc., on the first wall object 408A, then when the third light switch object 406C is selected and moved proximate to the third wall object 408C, the graphics program 118 automatically locates the third light switch object 406C on the third wall object 408C at the same or similar location, position, orientation, etc., as the first light switch 406A is located on the second wall object 408A. In this manner, the third light switch object 406C and/or the third wall object 408C inherit the relative location, position, orientation, direction, and other programmable attributes or properties of the first light switch object 406A and/or the first wall object 408A based on their location proximity.

No other placement, rotation, flip, etc., tools need be invoked by the user, unless the user decides to modify the affinitive placement of the third light switch object 406C and/or the third wall object 408C. Thus, a drawing can be created by "snapping" or "gluing" together several similarly-defined objects, where the graphics program 118 assists the user by showing the user which connections are proper, which connections are improper, and orienting and positioning each object for the user. This automatic orientation and positioning makes creation of drawings much simpler and less time consuming.

The example relationships for the "suggest from example" function may have been chosen because of their location proximity to the active object and its affinity object (e.g., the closest such example relationship), their time of selection proximity to the active object and its affinity object (e.g., a most-recently selected such example relationship), through user nomination, etc.

Logic of the Graphics Program

Figure 5:
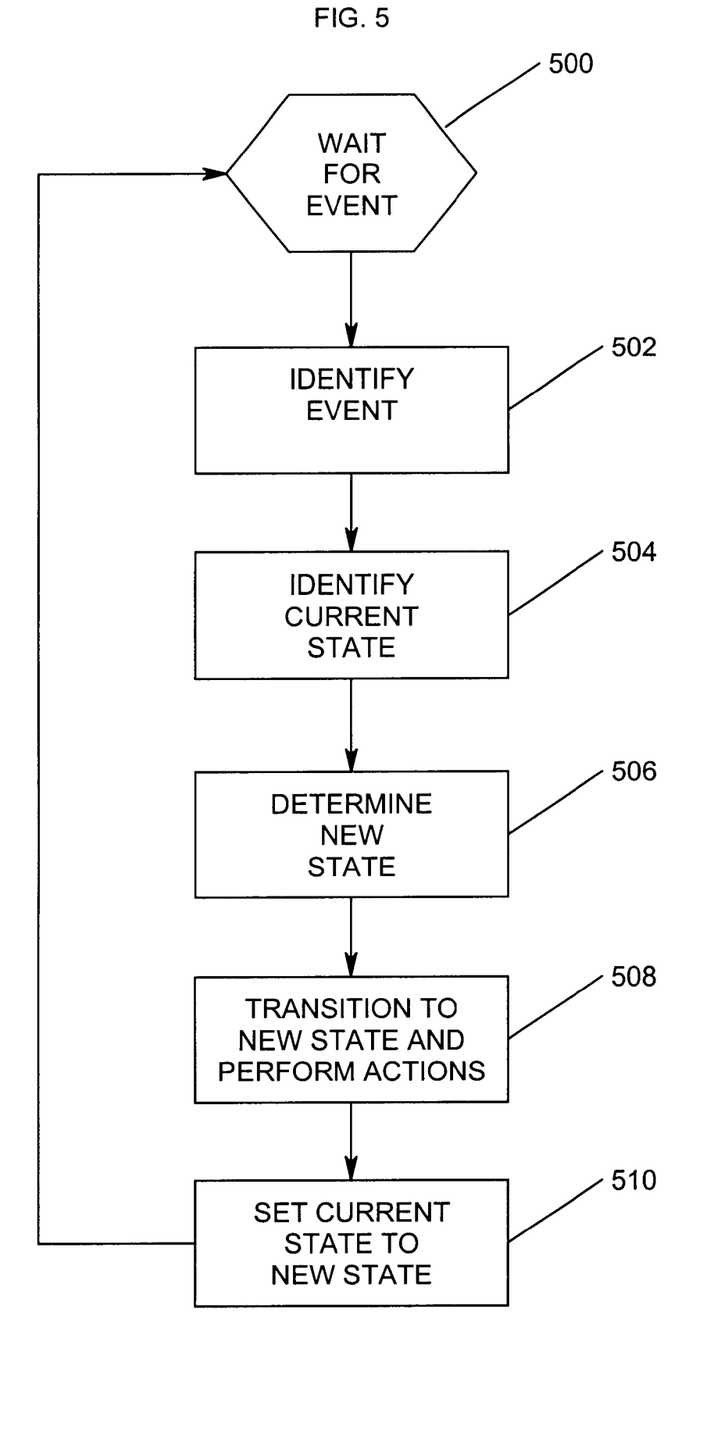
FIG. 5 is a flowchart that illustrates the general logic of a message or event-driven computer-implemented graphics program performing the steps of the preferred embodiment of the present invention.
Figure 6:
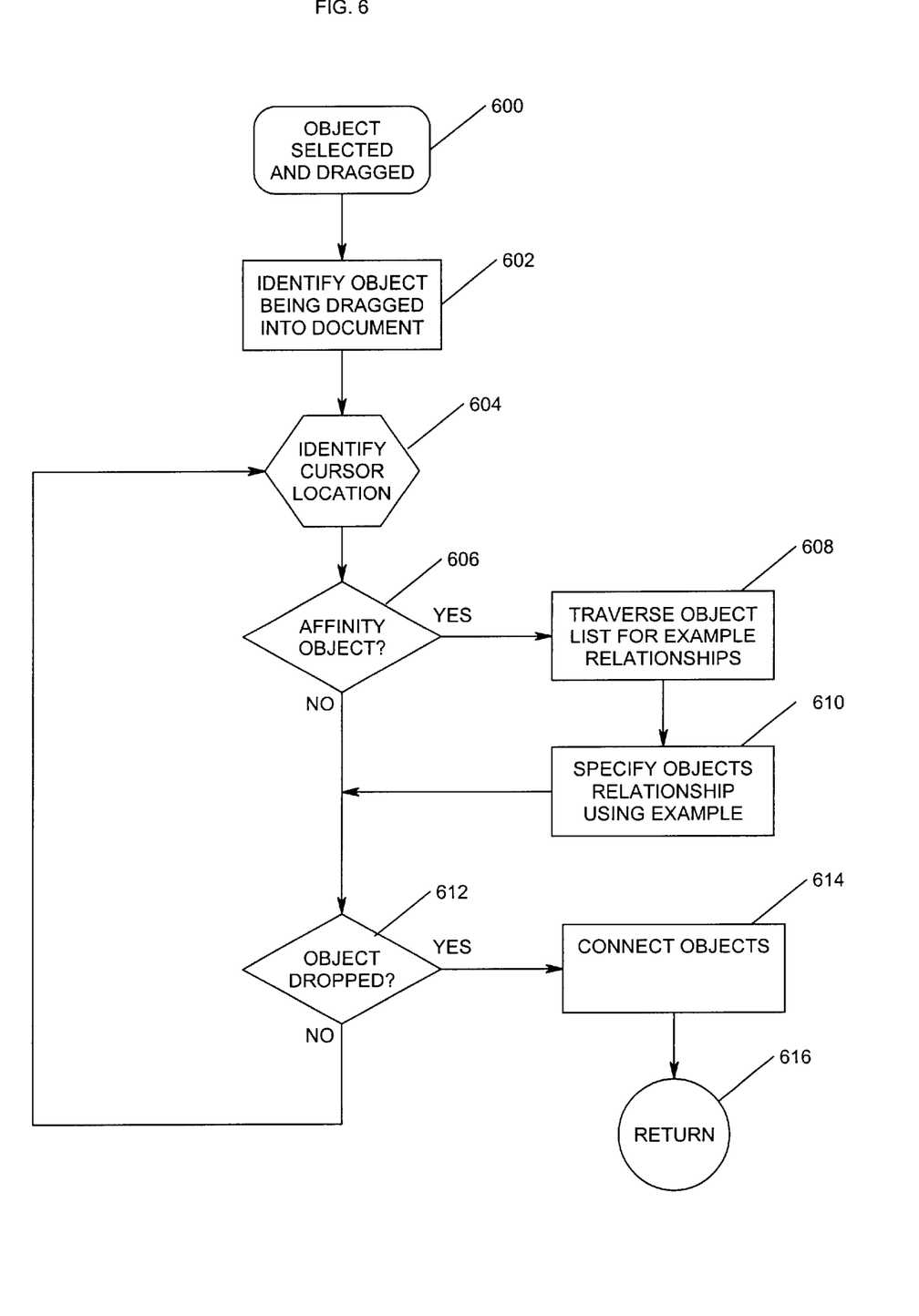
FIG. 6 is a flowchart that illustrates the general logic that is performed whenever an object is selected for placement according to the preferred embodiment of the present invention.

Flowcharts which illustrate the logic of the graphics program 118 according to the preferred embodiment of the present invention are shown in FIGS. 5 and 6. Those skilled in the art will recognize that this logic is provided for illustrative purposes only and that different logic may be used to accomplish the same results.

FIG. 5 is a flowchart that illustrates the general logic of a message or event-driven graphics program 118 performing the steps of the preferred embodiment of the present invention. In such a graphics program 118, operations are performed when transitions are made, based upon the receipt of messages or events, from present or current states to new states.

Generally, the flowchart begins by waiting at block 500 for an event (e.g., a mouse button click). It should be appreciated that, during this time, other operating system 116 tasks, e.g., file, memory, and video tasks, etc., may also be carried out. When an event occurs, control passes to block 502 to identify the event. Based upon the event, as well as the current state of the graphics program 118 determined in block 504, a new state is determined in block 506. In block 508, the logic transitions to the new state and performs any actions required for the transition. In block 510, the current state is set to the previously determined new state, and control returns to block 500 to wait for more input events.

The specific operations that are performed by block 508 when transitioning between states will vary depending upon the current state and the event. The various operations required to implement and maintain the preferred embodiment of the present invention represent particular events handled by the logic. However, it should be appreciated that these operations represent merely a subset of all of the events handled by the computer 100.

FIG. 6 is a flowchart that illustrates the general logic that is performed whenever an object is selected for placement according to the preferred embodiment of the present invention. The logic begins at block 600 when an object is selected from the object library window 404 and dragged into the working area of the main window 402 using a cursor (or alternatively, when a related function is invoked using some other mechanism).

Block 602 represents the graphics program 118 identifying the selected object being dragged into the work space of the main window 402 displayed on the monitor 110 as the active object.

Blocks 604–616 represent a loop that examines the relationship of the active object to other objects already present in the work space of the main window 402, wherein Block 604 represents the graphics program 118 identifying a current cursor location in the main window 402.

Block 606 represents the graphics program 118 determining whether the active object is located proximate to another object, i.e., an affinity object. If so, control transfers to Block 608; otherwise, control transfers to Block 612.

Block 608 represents the graphics program 118 traversing the object list 300 to find example relationships for the "suggest from example" function to assist in the placement of the object. In this step, the graphics program 118 examines both the active object and any affinity object. The graphics program 118 then examines other objects in the object list 300 that are similar to the active object and are attached to a similar affinity object or even the same affinity object. Generally, the graphics program 118 examines objects in the object list 300 that are either proximate to the active object based on time or location, visible from the active object, or have previously been nominated for use as an example by some action of the user. Specifically, the graphics program 118 provides suggested placement by examining the database 204 for example relationships between objects, and ranking these relationships according to their similarity to the active object and the affinity object.

Block 610 represents the graphics program 118 specifying the relationship for the placement of the active object using one or more of the example relationships found in the object list 300. Generally, the graphics program 118 provides a visual indication of the suggested placement of active object relative to the affinity object. In addition, the graphics program 118 may provide a visual indication of what objects and relationships therebetween were used as examples for the suggested placement of the active object relative to the affinity object. Note that the suggested placements are not limited to exact duplicates of the example relationships, but may only be similar due to geometric constructs, etc.

Block 612 is a decision block that represents the graphics program 118 determining whether the active object has been dropped onto a location in the work space of the main window 402. If so, control transfers to Block 614; otherwise, control transfers to Block 604. Generally, this step is performed when the left mouse button is released by the user when the cursor is positioned at a desired location, although other techniques for performing a similar function may be used as well.

Block 614 represents the graphics program 118 connecting the active object to the affinity object based on the specified relationship for the placement of the active object using one or more of the example relationships found in the object list 300, if any exists; otherwise, the active object is located at a position based on other constraints, logic, or selections. Thereafter, control transfers to Block 610, which terminates the logic.

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any program, function, or operating system providing graphical functions could benefit from the present invention.

In summary, the present invention discloses a method, apparatus, and article of manufacture for affinitive placement of objects by proximity, wherein two or more objects are automatically placed in a drawing relative to one another using similarly situated and previously-placed objects as examples for the suggested placement of the objects.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for placing one or more objects in a drawing displayed on a monitor attached to the computer, comprising:

(a) identifying two or more related objects that are similar to an active object and an affinity object; and (b) creating a relationship between the active object and the affinity object using a relationship between the identified related objects as an example, wherein the creating step (b) comprises placing the active object in the drawing relative to the affinity object using the relationship between the identified related objects.

2. The method of claim 1, wherein the active object is an object designated for placement.

3. The method of claim 1, wherein the active object is an object designated.

4. The method of claim 1, wherein the identifying step (a) further comprises identifying one or more related objects similar to the active object that are proximate to the active object.

5. The method of claim 1, wherein the identifying step (a) further comprises identifying one or more related objects similar to the active object that are proximate to the active object.

6. The method of claim 1, wherein the identifying step (a) further comprises identifying one or more related objects similar to the active object that have been previously nominated by the user.

7. The method of claim 1, further comprising:

wherein the identifying step (a) comprises identifying at least one first object similar to the active object that is attached to a second object similar to the affinity object; and wherein the creating step (b) comprises attaching the active object to the affinity object in a manner suggested by a relationship between the identified first and second objects.

8. The method of claim 1, further comprising:

wherein the identifying step (a) comprises identifying at least one object similar to the active object that is attached to the affinity object; and wherein the creating step (b) comprises attaching the active object to the affinity object in a manner suggested by a relationship between the identified object and the affinity object.

9. The method of claim 1, wherein the relationship comprises one or more attributes selected from a group comprising a relative location, position, orientation, and direction.

10. The method of claim 1, wherein the placing step comprises placing the active object in the drawing relative to the affinity object using the relationship between the identified related objects in a "suggest from example" function.

11. The method of claim 1, wherein the "suggest from example" function comprises placing the active object relative to the affinity object in a manner similar to the relationship between the identified related objects.

12. The method of claim 1, wherein the creating step (b) further comprises suggesting a placement of the active object relative to the affinity object using a plurality of examples.

13. The method of claim 12, further comprising ranking the examples for use in the suggested placement of the active object relative to the affinity object.

14. The method of claim 12, further comprising visually indicating the suggested placement of the active object relative to the affinity object.

15. The method of claim 12, further comprising visually indicating which object was used for the suggested placement of the active object relative to the affinity object.

16. A computer-implemented system for placing one or more objects in a drawing, comprising:

(a) a computer having a monitor attached thereto;

(b) means, performed by the computer, for identifying two or more related objects that are similar to an active object and an affinity object; and (c) means, performed by the computer, for creating a relationship between the active object and the affinity object using a relationship between the identified related objects as an example, wherein the means for creating (c) comprises means for placing the active object in the drawing relative to the affinity object using the relationship between the identified related objects.

17. The system of claim 16, wherein the active object is an object designated for placement.

18. The system of claim 16, wherein the active object is an object designated for movement.

19. The system of claim 16, wherein the means for identifying (b) further comprises means for identifying one or more related objects similar to the active object that are proximate to the active object.

20. The system of claim 16, wherein the means for identifying (b) further comprises means for identifying one or more related objects similar to the active object that are visible from the active object.

21. The system of claim 16, wherein the means for identifying (b) further comprises means for identifying one or more related objects similar to the active object that have been previously nominated by the user.

22. The system of claim 16, further comprising:
wherein the means for identifying (b) comprises means for identifying at least one first object similar to the active object that is attached to a second object similar to the affinity object; and
wherein the means for creating (c) comprises means for attaching the active object to the affinity object in a manner suggested by a relationship between the identified first and second objects.

23. The system of claim 16, further comprising:
wherein the means for identifying (b) comprises means for identifying at least one object similar to the active object that is attached to the affinity object; and
wherein the means for creating (c) comprises means for attaching the active object to the affinity object in a manner suggested by a relationship between the identified object and the affinity object.

24. The system of claim 16, wherein the relationship comprises one or more attributes selected from a group comprising a relative location, position, orientation, and direction.

25. The system of claim 16, wherein the means for placing comprises means for placing the active object in the drawing relative to the affinity object using the relationship between the identified related objects in a "suggest from example" function.

26. The system of claim 16, wherein the "suggest from example" function comprises means for placing the active object relative tot he affinity object in a manner similar to the relationship between the identified related objects.

27. The system of claim 16, wherein the means for creating (c) further comprises means for suggesting a placement of the active object relative to the affinity object using a plurality of examples.

28. The system of claim 27, further comprising means for ranking the examples for use in the suggested placement of the active object relative to the affinity object.

29. The system of claim 27, further comprising means for visually indicating the suggested placement of the active object relative to the affinity object.

30. The system of claim 27, further comprising means for visually indicating which object was used for the suggested placement of the active object relative to the affinity object.

31. An article of manufacture embodying logic for performing a method for placing one or more objects in a drawing displayed on a monitor attached to the computer, the method comprising:
(a) identifying two or more related objects that are similar to an active object and an affinity object; and (b) creating a relationship between the identified related objects as an example, wherein the creating step (b) comprises placing the active object in the drawing relative to the affinity object using the relationship between the identified related objects.

32. The article of manufacture of claim 31, wherein the active object is an object designated for placement.

33. The article of manufacture of claim 31, wherein the active object is an object designated for movement.

34. The article of manufacture of claim 31, wherein the identifying step (a) further comprises identifying one or more related objects similar to the active object that are proximate to the active object.

35. The article of manufacture of claim 31, wherein the identifying step (a) further comprises identifying one or more related objects similar to the active object that are visible from the active object.

36. The article of manufacture of claim 31, wherein the identifying step (a) further comprises identifying ore or more related objects similar to the active object that have been previously nominated by the user.

37. The article of manufacture of claim 31, further comprising:
wherein the identifying step (a) comprises identifying at least one first object similar to the active object that is attached to a second object similar to the affinity object; and
wherein the creating step (b) comprises attaching the active object to the affinity object in a manner suggested by a relationship between the identified first and second objects.

38. The article of manufacture of claim 31, further comprising:
wherein the identifying step (a) comprises identifying at least one object similar to the active object that is attached to the affinity object; and
wherein the creating step (b) comprises attaching the active object to the affinity object in a manner suggested by a relationship between the identified object and the affinity object.

39. The article of manufacture of claim 31, wherein the relationship comprises one or more attributes selected from a group comprising a relative location, position, orientation, and direction.

40. The article of manufacture of claim 31, wherein the placing step comprises placing the active object in the drawing relative to the affinity object using the relationship between the identified related objects in a "suggest from example" function.

41. The article of manufacture of claim 31, wherein the "suggest from example" function comprises placing the active object relative to the affinity object in a manner similar to the relationship between the identified related objects.

42. The article of manufacture of claim 31, wherein the creating step (b) further comprises suggesting a placement of the active object relative to the affinity object using a plurality of examples.

43. The article of manufacture of claim 42, further comprising ranking the examples for use in the suggested placement of the active object relative to the affinity object.

44. The article of manufacture of claim 42, further comprising visually indicating the suggested placement of the active object relative to the affinity object.

45. The article of manufacture of claim 42, further comprising visually indicating which object was used for the suggested placement of the active object relative to the affinity object.

* * * * *

UNITED STATES PATENT AND TRADEMARK OFFICE
CERTIFICATE OF CORRECTION

PATENT NO.   : 6,417,865 B1
DATED        : July 9, 2001
INVENTOR(S)  : Robert E. Bou It is certified that error appears in the above-identified patent and that said Letters Patent is hereby corrected as shown below:

Column 8,
Line 6, after "designated" insert -- for movement --

Column 9,
Line 48, "tot he" should read -- to the --
Line 67, "(b)" should be moved to Column 10, Line 1

Column 10,
Line 1, after "the" insert -- active object and the affinity object using a relationship between the --

Signed and Sealed this

Eighth Day of July, 2003

JAMES E. ROGAN
*Director of the United States Patent and Trademark Office*